United States Patent
Carneal et al.

(10) Patent No.: US 6,532,220 B1
(45) Date of Patent: Mar. 11, 2003

(54) SYSTEM AND METHOD FOR EFFICIENT CHANNEL ASSIGNMENT

(75) Inventors: Bruce L. Carneal, Del Mar, CA (US); Min Zhu, San Diego, CA (US)

(73) Assignee: Tachyon, Inc., San Diego, CA (US)

( * ) Notice: Subject to any disclaimer, the term of this patent is extended or adjusted under 35 U.S.C. 154(b) by 0 days.

(21) Appl. No.: 09/407,640

(22) Filed: Sep. 28, 1999

Related U.S. Application Data

(60) Provisional application No. 60/151,282, filed on Aug. 27, 1999.

(51) Int. Cl.[7] ................................................ H04Q 7/20
(52) U.S. Cl. ........................ 370/329; 370/331; 455/450
(58) Field of Search ............................... 370/329, 321, 370/322, 330, 337, 338, 348; 455/450, 451, 452

(56) References Cited

U.S. PATENT DOCUMENTS

| | | |
|---|---|---|
| 3,611,435 A | 10/1971 | Cooper |
| 3,818,453 A | 6/1974 | Schmidt et al. |
| 4,543,574 A | 9/1985 | Takagi et al. |
| 4,545,061 A | 10/1985 | Hileman |
| 4,555,782 A | 11/1985 | Alaria et al. |
| 4,736,371 A | 4/1988 | Tejima et al. |
| 4,763,325 A | 8/1988 | Wolfe et al. |
| 4,774,707 A | 9/1988 | Raychaudhuri |
| 4,811,200 A | 3/1989 | Wagner et al. |
| 4,837,786 A | 6/1989 | Gurantz et al. |
| 4,841,527 A | 6/1989 | Raychaudhuri et al. |
| 4,868,795 A | 9/1989 | McDavid et al. |
| 5,012,469 A | 4/1991 | Sardana |
| 5,121,387 A | 6/1992 | Gerhardt et al. |
| 5,159,592 A | 10/1992 | Perkins |
| 5,166,929 A | 11/1992 | Lo |

(List continued on next page.)

FOREIGN PATENT DOCUMENTS

| | | |
|---|---|---|
| EP | 0 722 228 A2 | 7/1966 |
| EP | 0 026 603 | 4/1981 |
| EP | 0 097 309 | 1/1984 |
| EP | 0 584 820 A1 | 3/1994 |
| EP | 0 755 164 A2 | 1/1997 |
| EP | 0 889 660 A2 | 1/1999 |
| EP | 0 889 664 A2 | 1/1999 |
| EP | 0 901 253 A2 | 3/1999 |
| EP | 0 912 015 A2 | 4/1999 |
| EP | 0 912 016 A2 | 4/1999 |
| EP | 0 913 968 A1 | 5/1999 |
| EP | 0 913 970 A1 | 5/1999 |
| EP | 0 915 592 A1 | 5/1999 |
| EP | 0 917 317 A1 | 5/1999 |
| EP | 0 920 226 A2 | 6/1999 |
| EP | 0 923 266 | 6/1999 |
| WO | 94/19530 | 9/1994 |
| WO | 95/34153 | 12/1995 |
| WO | 96/05690 | 2/1996 |
| WO | 96/11535 | 4/1996 |

(List continued on next page.)

Primary Examiner—Edward F. Urban
Assistant Examiner—Erika A. Gary
(74) Attorney, Agent, or Firm—Knobbe, Martens, Olson & Bear, LLP

(57) ABSTRACT

A system and method is described for transmitting data from a remote unit to a hub station in order to transmit data across a wide area network, such as the Internet. The remote unit and the hub station have stored frequency tables that include the possible reverse link transmission frequencies. When a remote unit requests a frequency channel, the hub station broadcasts a message that includes the identifier of each remote unit that has requested a reverse link transmission channel. The list of identifiers from the hub station is in a specific order so that it can be stored into each remote unit's frequency table. Once the list of identifiers is stored, the remote unit can find its identifier's position within the frequency table to determine the frequency channel that was assigned by the hub station.

11 Claims, 4 Drawing Sheets

U.S. PATENT DOCUMENTS

| | | |
|---|---|---|
| 5,172,375 A | 12/1992 | Kou |
| 5,216,427 A | 6/1993 | Yan et al. |
| 5,239,677 A | 8/1993 | Jasinski |
| 5,276,703 A | 1/1994 | Budin et al. |
| 5,297,144 A | 3/1994 | Gilbert et al. |
| 5,345,583 A | 9/1994 | Davis |
| 5,381,443 A | 1/1995 | Borth et al. |
| 5,384,777 A | 1/1995 | Ahmadi et al. |
| 5,420,864 A | 5/1995 | Dahlin et al. |
| 5,471,473 A | 11/1995 | Tejima |
| 5,485,464 A | 1/1996 | Strodtbeck et al. |
| 5,490,087 A | 2/1996 | Redden et al. |
| 5,537,397 A | 7/1996 | Abramson |
| 5,539,730 A | 7/1996 | Dent |
| 5,541,924 A | 7/1996 | Tran et al. |
| 5,550,992 A | 8/1996 | Hashimoto |
| 5,566,168 A | 10/1996 | Dent |
| 5,570,355 A | 10/1996 | Dail et al. |
| 5,577,024 A | 11/1996 | Malkamaki et al. |
| 5,586,121 A | 12/1996 | Moura et al. |
| 5,612,703 A | 3/1997 | Mallinckrodt |
| 5,613,195 A | 3/1997 | Ooi |
| 5,615,212 A | 3/1997 | Ruszczyk et al. |
| 5,638,361 A | 6/1997 | Ohlson et al. |
| 5,642,354 A | 6/1997 | Spear |
| 5,644,576 A | 7/1997 | Bauchot et al. |
| 5,651,009 A | 7/1997 | Perreault et al. |
| 5,652,892 A | 7/1997 | Ugajin |
| 5,673,322 A | 9/1997 | Pepe et al. |
| 5,677,909 A | 10/1997 | Heide |
| 5,678,208 A | 10/1997 | Kowalewski et al. |
| 5,696,903 A | 12/1997 | Mahany |
| 5,704,038 A | 12/1997 | Mueller et al. |
| 5,706,278 A | 1/1998 | Robillard et al. |
| 5,732,328 A | 3/1998 | Mitra et al. |
| 5,734,833 A | 3/1998 | Chiu et al. |
| 5,745,485 A | 4/1998 | Abramson |
| 5,758,088 A | 5/1998 | Bezaire et al. |
| 5,768,254 A | 6/1998 | Papadopoulos et al. |
| 5,790,533 A | 8/1998 | Burke et al. |
| 5,790,535 A | 8/1998 | Kou |
| 5,790,551 A | 8/1998 | Chan |
| 5,790,939 A | 8/1998 | Malcolm et al. |
| 5,790,940 A | 8/1998 | Laborde et al. |
| 5,796,726 A | 8/1998 | Hassan et al. |
| 5,802,061 A | 9/1998 | Agarwal |
| 5,809,093 A | 9/1998 | Cooper |
| 5,809,400 A | 9/1998 | Abramsky et al. |
| 5,809,414 A | 9/1998 | Coverdale et al. |
| 5,815,652 A | 9/1998 | Ote et al. |
| 5,815,798 A | 9/1998 | Bhagalia et al. |
| 5,818,831 A | 10/1998 | Otonari |
| 5,818,845 A | 10/1998 | Moura et al. |
| 5,818,887 A | 10/1998 | Sexton et al. |
| 5,822,311 A | 10/1998 | Hassan et al. |
| 5,828,655 A | 10/1998 | Moura et al. |
| 5,848,064 A | 12/1998 | Cowan |
| 5,859,852 A | 1/1999 | Moura et al. |
| 5,862,452 A | 1/1999 | Cudak et al. |
| 5,872,820 A | 2/1999 | Upadrasta |
| 5,889,766 A | 3/1999 | Ohnishi et al. |
| 5,905,719 A | 5/1999 | Arnold et al. |
| 5,905,955 A * | 5/1999 | Bamburak et al. .......... 455/434 |
| 5,909,447 A | 6/1999 | Cox et al. |
| 5,910,945 A | 6/1999 | Garrison et al. |
| 5,915,207 A | 6/1999 | Dao et al. |
| 5,926,458 A | 7/1999 | Yin |
| 5,946,602 A | 8/1999 | Sayegh |
| 5,958,018 A | 9/1999 | Eng et al. |
| 5,959,982 A | 9/1999 | Federkins et al. |
| 5,960,001 A | 9/1999 | Shaffer et al. |
| 5,963,557 A | 10/1999 | Eng |
| 5,966,412 A | 10/1999 | Ramaswamy |
| 5,966,636 A | 10/1999 | Corrigan et al. |
| 6,094,426 A * | 7/2000 | Honkasalo et al. .......... 370/331 |
| 6,198,730 B1 * | 3/2001 | Hogberg et al. ............ 370/320 |

FOREIGN PATENT DOCUMENTS

| | | |
|---|---|---|
| WO | 97/11566 | 3/1997 |
| WO | 07/38502 | 10/1997 |
| WO | 97/37457 | 10/1997 |
| WO | 97/47158 | 12/1997 |
| WO | 97/50249 | 12/1997 |
| WO | 98/12829 | 3/1998 |
| WO | 98/12833 | 3/1998 |
| WO | 98/16046 | 4/1998 |
| WO | 98/19466 | 5/1998 |
| WO | 98/20724 | 5/1998 |
| WO | 98/23112 | 5/1998 |
| WO | 98/24250 | 6/1998 |
| WO | 98/37669 | 8/1998 |
| WO | 98/37706 | 8/1998 |
| WO | 98/44747 | 10/1998 |
| WO | 98/47236 | 10/1998 |
| WO | 98/49625 | 11/1998 |
| WO | 98/54858 | 12/1998 |
| WO | 98/54859 | 12/1998 |
| WO | 99/04338 | 1/1999 |
| WO | 99/04508 | 1/1999 |
| WO | 99/04509 | 1/1999 |
| WO | 99/04521 | 1/1999 |
| WO | 99/05828 | 2/1999 |
| WO | 99/13616 | 3/1999 |
| WO | 99/14963 | 3/1999 |
| WO | 99/16201 | 4/1999 |
| WO | 99/19996 | 4/1999 |
| WO | 99/19999 | 4/1999 |
| WO | 99/21287 | 4/1999 |
| WO | 99/21291 | 4/1999 |
| WO | 99/21296 | 4/1999 |
| WO | 99/21328 | 4/1999 |
| WO | 99/21329 | 4/1999 |
| WO | 99/21378 | 4/1999 |
| WO | 99/21381 | 4/1999 |
| WO | 99/22500 | 6/1999 |
| WO | 99/39480 | 8/1999 |

* cited by examiner

|  |  | 130 | 134 | 136 | 138 |
|---|---|---|---|---|---|
|  |  |  | 132 |  |  |
|  | #1 |  |  |  |  |
|  | #2 |  |  |  |  |
|  | #3 |  |  |  |  |
| Frequency | #4 |  |  |  |  |
|  | #5 |  |  | 140 |  |
|  | #6 |  |  |  |  |
|  | #7 |  |  |  |  |
|  |  | 1 | 2 | 3 |

Time Slot

FIGURE 2

|  |  | 150 |  | 152 |  |
|---|---|---|---|---|---|
|  | #1 | 33 | 21 | 01 |  |
|  | #2 | 55 | 54 | 88 | 154 |
|  | #3 | 67 | 26 | 98 |  |
| Frequency | #4 | 99 | 84 | 32 |  |
|  | #5 | 23 | 90 | 29 |  |
|  | #6 | 67 | 34 | 53 |  |
|  | #7 | 11 | 123 | 52 |  |
|  |  | 1 | 2 | 3 |  |

Time Slot

FIGURE 3

SYSTEM AND METHOD FOR EFFICIENT CHANNEL ASSIGNMENT

This application claims benefit of Provisional Application No. 60/151,282, filed Aug. 27, 1999.

FIELD OF THE INVENTION

The present invention relates generally to communication systems. More specifically, the invention relates to assigning communication channels in a wireless communication system.

DESCRIPTION OF THE RELATED ART

The use of wireless communication systems for the transmission of digital data is becoming more and more pervasive. In a wireless system, the most precious resource in terms of cost and availability is typically the wireless link itself. Therefore, one major design goal in designing a communication system comprising a wireless link is to efficiently use the available capacity of the wireless link.

In a time division multiple access (TDMA) system, which also uses frequency division, a frequency channel is defined by a center frequency and a time slot. Within a frequency channel, each remote unit has its own remote unit ID number and is assigned resources in round robin fashion. Thus, if three TDMA frequency channels are created, each of the remote units assigned to the frequency channel transmits approximately one third of the time.

In a typical system, the hub station dictates which channel the remote unit uses for communicating back to the hub station. The communication from the remote unit to the hub station is termed a "reverse link" whereas communication from the hub station to the remote unit is termed a "forward link".

In a conventional wireless system, if the remote unit needs to send data over a reverse link, it requests a channel from the hub station. In response to all of the remote unit channel requests, the hub station then generates a broadcast message that is sent to all of the remote units and provides each of their frequency channel assignments. A typical broadcast message includes the frequency, time slot and remote unit ID number of each remote unit that has indicated it has data to send.

Each remote unit receives the broadcast message, and determines its proper frequency and channel by waiting until its remote unit ID number is broadcast. However, this type of system requires a tremendous amount of information to be sent from the hub station to the remote units in every broadcast message. This is disadvantageous because all of the broadcast message overhead prevents user data from being sent through the system. Thus, there is a need in the art for a more efficient way of assigning remote unit channels in a wireless communication system.

SUMMARY OF THE INVENTION

One embodiment of the invention is a method for assigning reverse link resources to a plurality of remote units, comprising the steps of: receiving at a hub station requests for reverse link resources from a plurality of remote units; determining an assignment of reverse link channels to the plurality of remote units; creating a message designating the assignment wherein the message designates explicitly a set of remote unit identifiers corresponding to the plurality of remote units and implicitly designates a channel according to the location of the identifier within the message; and broadcasting the message to the plurality of remote units.

Embodiments of the invention also provide a remote unit method for allocating reverse link resources in a multiple access communication system, comprising the steps of: requesting reverse link resources from a hub station; receiving a broadcast message assigning reverse link resources to a plurality of remote units wherein said broadcast message designates explicitly a plurality of remote unit identifiers and implicitly designates a channel according to its location within the message; and transmitting a signal over a reverse link channel corresponding to a location of the remote unit identifiers within the broadcast message.

Another embodiment of the invention is an apparatus which assigns reverse link resources to a plurality of remote units, comprising: means for receiving at a hub station requests for reverse link resources from a plurality of remote units; means for determining an assignment of reverse link channels to the plurality of remote units; means for creating a message designating said assignment wherein the message designates explicitly a set of remote unit identifiers corresponding to the plurality of remote units and implicitly designates a channel according to the location of the identifier within the message; and means for broadcasting the message to the plurality of remote units.

Embodiments of the invention also provide an apparatus which allocates reverse link resources in a multiple access communication system, comprising: means for requesting reverse link resources from a hub station; means for receiving a broadcast message at the hub station assigning reverse link resources to a plurality of remote units wherein the broadcast message designates explicitly a plurality of remote unit identifiers and implicitly designates a channel according to its location within the message; and means for transmitting a signal over a reverse link channel corresponding to a location of the remote unit identifiers within the broadcast message.

Yet another embodiment of the invention is a system for allocating reverse link resources in a multiple access communication system, comprising: a hub station for receiving requests for reverse link resources from a plurality of remote units; determining an assignment of reverse link channels to the plurality of remote units; creating a message designating the assignment wherein the message designates explicitly a set of remote unit identifiers corresponding to the plurality of remote units and implicitly designates a channel according to the location of the identifier within the message; broadcasting the message to the plurality of remote units; a remote unit for requesting reverse link resources from the hub station; receiving a broadcast message assigning reverse link resources to a plurality of remote units wherein the broadcast message designates explicitly a plurality of remote unit identifiers and implicitly designates a channel according to its location within the message; and transmitting a signal over a reverse link channel corresponding to a location of the remote unit identifier within the broadcast message. Preferably, the reverse link comprises a satellite link. In one aspect of a preferred embodiment, not all of the channels are assigned. Preferably, the channels are assigned in order and the message is terminated when all of the reverse link resources are assigned. Alternatively, a dummy remote unit identifier is sent in unassigned channel locations.

BRIEF DESCRIPTION OF THE FIGURES

FIG. 2 is a table showing frequency and time slots.

FIG. 3 is a table showing assignment of remote units to particular frequencies and time slots.

DETAILED DESCRIPTION OF THE INVENTION

A. Definitions

1. Instructions

Figure 1:
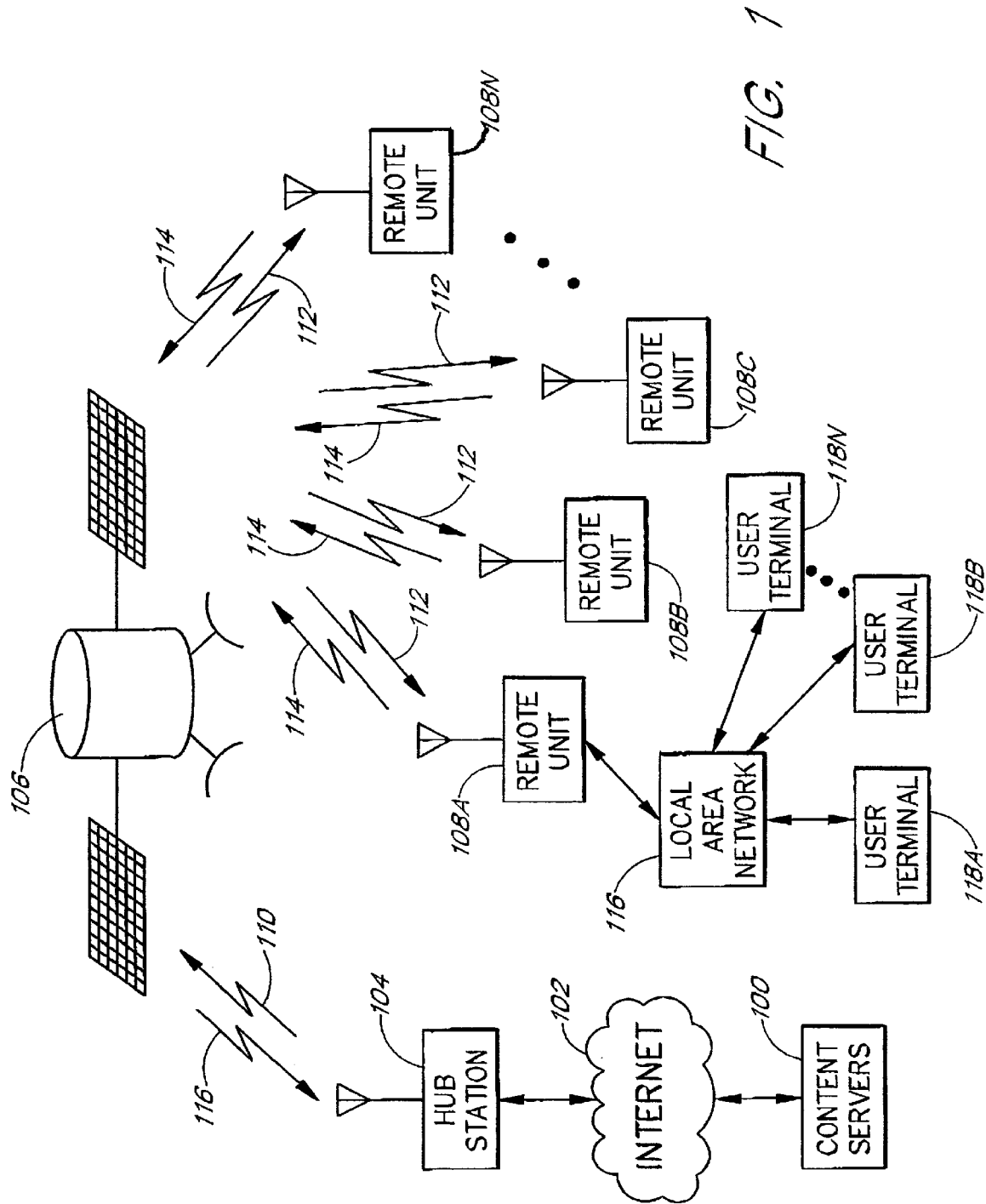
FIG. 1 is a schematic diagram of the multiple access communication system of the invention.

Instructions refer to computer-implemented steps for processing information in the system. Instructions can be implemented in software, firmware or hardware and include any type of programmed step undertaken by modules of the communication system.

2. LAN

One example of the Local Area Network may be a corporate computing network, including access to the Internet, to which computers and computing devices comprising the communication system are connected. In one embodiment, the LAN conforms to the Transmission Control Protocol/Internet Protocol (TCP/IP) industry standard. In alternative embodiments, the LAN may conform to other network standards, including, but not limited to, the International Standards Organization's Open Systems Interconnection, IBM's SNA, Novell's Netware, and Banyan VINES.

3. Microprocessor

The microprocessor may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. The microprocessor typically has conventional address lines, conventional data lines, and one or more conventional control lines.

4. Modules

The communication system is comprised of various modules as discussed in detail below. As can be appreciated by one of ordinary skill in the art, each of the modules comprise various sub-routines, procedures, definitional statements, and macros. Each of the modules are typically separately compiled and linked into a single executable program. Therefore, the following description of each of the modules is used for convenience to describe the functionality of the communication system. Thus, the processes that are undergone by each of the modules may be arbitrarily redistributed to one of the other modules, combined together in a single module, or made available in, for example, a shareable dynamic link library.

5. Networks

The communication system may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, handheld, set-top, or any other desired type of configuration. As used herein, an Internet includes network variations such as public internet, a private internet, a secure internet, a private network, a public network, a value-added network, an intranet, and the like.

6. Operating Systems

The communication system may be used in connection with various operating systems such as: UNIX, Disk Operating System (DOS), OS/2, Windows 3.X, Windows 95, Windows 98, and Windows NT.

7. Programming Languages

The communication system may comprise software that is written in any programming language such as C, C++, BASIC, Pascal, Java, and FORTRAN and run under the well-known operating system. C, C++, BASIC, Pascal, Java, and FORTRAN are industry standard programming languages for which many commercial compilers can be used to create executable code.

8. Transmission Control Protocol

Transmission Control Protocol (TCP) is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP provides protocol ports to distinguish multiple programs executing on a single device by including the destination and source port number with each message. TCP performs functions such as transmission of byte streams, data flow definitions, data acknowledgments, lost or corrupt data re-transmissions, and multiplexing multiple connections through a single network connection. Finally, TCP is responsible for encapsulating information into a datagram structure.

B. System

FIG. 1 is a block diagram illustrating an exemplifying system in which the invention may be embodied. The system in FIG. 1 provides high-speed, reliable Internet communication service over a satellite link.

In particular, in FIG. 1, content servers 100 are coupled to the Internet 102 which is in turn coupled to a hub station 104 such that the hub station 104 can request and receive digital data from the content servers 100. The hub station 104 also communicates via satellite 106 with a plurality of remote units 108A–108N. For example, the hub station 104 transmits signals over a forward uplink 110 to the satellite 106. The satellite 106 receives the signals from the forward uplink 110 and re-transmits them on a forward downlink 112. Together, the forward uplink 110 and the forward downlink 112 are referred to as the forward link. The remote units 108A–108N monitor one or more channels which comprise the forward link in order to receive remote-unit-specific and broadcast messages from the hub station 104.

In a similar manner, the remote units 108A–108N transmit signals over a reverse uplink 114 to the satellite 106. The satellite 106 receives the signals from the reverse uplink 114 and re-transmits them on a reverse downlink 116. Together, the reverse uplink 114 and the reverse downlink 116 are referred to as the reverse link. The hub station 104 monitors one or more reverse link transmission channels which comprise the reverse link in order to extract messages from the remote units 108A–108N. For example, in one embodiment of the exemplifying system, the reverse link carries multiple access channels in accordance with assignee's co-pending application entitled METHOD AND APPARATUS FOR MULTIPLE ACCESS IN A COMMUNICATION SYSTEM, application Ser. No. 09/407,639 , filed concurrently herewith, the entirety of which is hereby incorporated by reference.

In one embodiment of the exemplifying system, each remote unit 108A–108N is coupled to a plurality of system users. For example, in FIG. 1, the remote unit 108A is shown as coupled to a local area network 116 which in turn is coupled to a group of user terminals 118A–118N. The user terminals 118A–118N may be one of many types of local area network nodes such as a personal or network computer, a printer, digital meter reading equipment or the like. When a message is received over the forward link intended for one of the user terminals 118A–118N, the remote unit 108A forwards it to the appropriate user terminal 118 over the local area network 116. Likewise, the user terminals 118A–118N can transmit messages to the remote unit 108A over the local area network 116.

In one embodiment of the exemplifying system, the remote units 108A–108N provide Internet service to a plurality of users. For example, assume that the user terminal 118A is a personal computer which executes browser software in order to access the World Wide Web. When the browser receives a request for a web page or embedded object from the user, the user terminal 118A creates a request message according to well-known techniques. The user terminal 118A forwards the request message over the local area network 116 to the remote unit 108A, also using well-known techniques. Based upon the request message, the remote unit 108A creates and transmits a wireless link request over a channel within the reverse uplink 114 and the reverse downlink 116. The hub station 104 receives the wireless link request over the reverse link. Based upon the wireless link request, the hub station 104 passes a request message to the appropriate content server 100 over the Internet 102.

In response, the content server 100 forwards the requested page or object to the hub station 104 over the Internet 102. The hub station 104 receives the requested page or object aid creates a wireless link response. The hub station transmits the wireless link response over a channel within the forward uplink 110 and forward downlink 112. For example, in one embodiment of the exemplifying system the hub station 104 operates in accordance with assignee's co-pending application entitled TRANSMISSION OF TCP/IP DATA OVER A WIRELESS COMMUNICATION CHANNEL, application Ser. No. 09/407,646, and assignee's co-pending application entitled METHOD AND SYSTEM FOR FREQUENCY SPECTRUM RESOURCE ALLOCATION, application Ser. No. 09/407,645 [Attorney Docket No. TACHYON.039A], each of which is filed concurrently herewith and the entirety of which is hereby incorporated by reference.

The remote unit 108A receives the wireless link response and forwards a corresponding response message to the user terminal 118A over the local area network 116. In one embodiment of the exemplifying system, the process of retrieving a web page or object is executed in accordance with assignee's co-pending application entitled DISTRIBUTED SYSTEM AND METHOD FOR PREFETCHING OBJECTS, application Serial No. 09/129,142 filed Aug. 5, 1998, the entirety of which is hereby incorporated by reference. In this way, a bi-directional link between the user terminal 118A and the content servers 100 is established.

In one embodiment, communication resources are allocated to a set of requesting remote units according to the teachings of the above referenced co-pending application entitled METHOD AND SYSTEM FOR FREQUENCY SPECTRUM RESOURCE ALLOCATION, application Ser. No. 09/407,645 and the invention is used to notify the set of remote units as to the resource allocation information.

Embodiments of the invention provide an efficient method and system for sending data by assigning frequencies and time slots between a hub station and a remote unit. In one embodiment, a remote unit requests a transmission channel so that it can send data to the hub station. In response to this request, and requests from other remote units, the hub station sends a broadcast message having an ordered sequence of remote unit identifiers. Each remote unit receives the ordered sequence of remote identifiers and determines the position of its own identifier in the sequence. By referencing the position of its identifier in the sequence, the remote unit determines the proper transmission channel use for sending data.

For example, if the remote unit's identifier is the third identifier sent by the hub station in the ordered sequence, the remote unit will match the number three to an internal list or table of transmission channels. As one example, the third entry in the internal list or table might be "frequency 2, time slot 1". Thus, a transmission channel having frequency 2, time slot 1, will be used by the remote unit to transmit data to the hub station.

Although the following embodiment discusses storing and retrieving data from a table, the invention is not so limited. The invention relates to a system whereby a string of remote unit identifiers are received by the remote unit and used to implicitly determine the proper data transmission channel.

In one embodiment, the hub station and each remote unit maintain identical frequency tables of all possible transmission frequencies and time slots that can be used to transmit data. When a plurality of remote units send requests for a transmission frequency and time slot in order to transmit data, the hub station can send out a single broadcast message that contains only remote unit identifiers. Each remote unit receives the broadcast message and stores the list of identifiers in the frequency table.

Instructions are then run in each remote unit to search the frequency table for the remote unit's own identifier. Once the position of the identifier is determined, the associated transmission frequency can be discovered by the identifier's position in the frequency table. This process will be discussed in more detail below.

FIG. 2 shows an example of one embodiment of a frequency table that is stored in the hub station 104 and in each of the remote units 108. The frequency table has a list of the potential reverse link frequencies (rows) and time slots (columns) that can be used by the remote unit to communicate with the hub station. As will be discussed below, the frequency table represents a resource grid for assigning reverse link transmission channels to remote units.

As one example, a row 130 corresponds to the lowest frequency used for reverse link transmissions and includes several columns 134, 136 and 138 that correspond to potential time slots within the lowest frequency. Thus, a particular remote unit is assigned to a transmission channel (having a frequency and time slot) by being stored in a particular row and column of the frequency table. One example of a transmission channel assignment is shown in block 140 (time slot 2, frequency 5). Of course, this figure is only exemplary in providing seven frequencies and three time slots. The present apparatus and method can be used to assign any number of frequencies and time slots.

Remote units are assigned to a transmission channel as shown in FIG. 3. A unique remote unit (RU) identifier is associated with each time slot/frequency combination by storage to the table. For example, RU identifier 33 is assigned to frequency 1, time slot 1 (block 150); RU identifier 84 is assigned to frequency 4, time slot 2 (block 152) and RU identifier 98 is assigned to frequency 3, time slot 3 (block 154).

When the hub station sends a broadcast message which provides the channel assignments for RUs 33, 21, 01, 55, 54, 88, 67, 26, 98, 99, 84, 32, 23, 90, 29, 67, 34, 53, 11, 123, 52, each remote unit can determine its transmission frequency assignment by storing the message to the frequency table and finding the location of its identifier within the table.

C. Process

Figure 4:
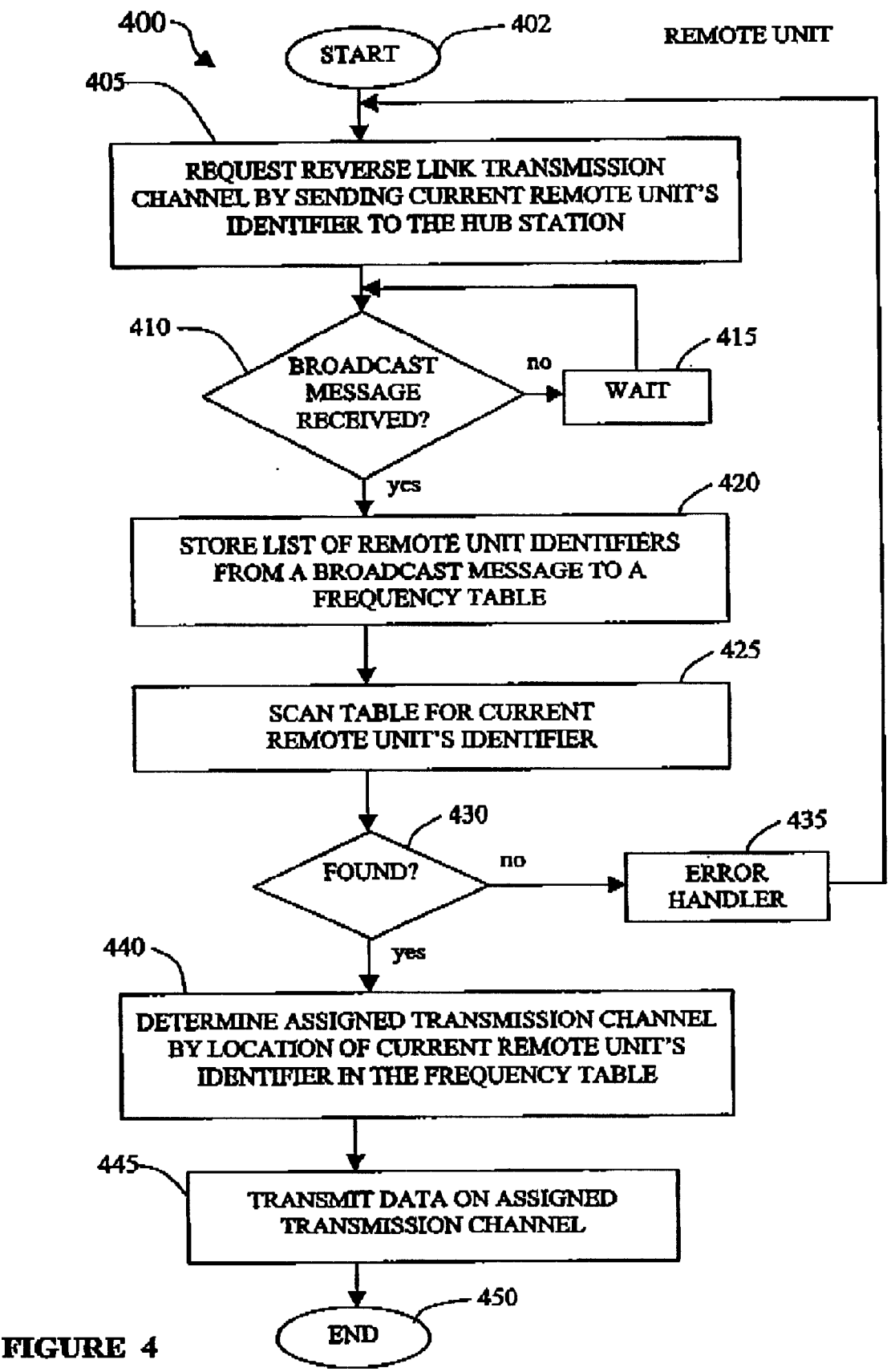
FIG. 4 is a flow chart showing hub station operation.

FIG. 4 is a flow diagram illustrating a process 400 that is undertaken within the remote unit 108 for transmitting data along a reverse link transmission from the remote unit to a hub station. The process 400 begins at a start state 402 and moves to a state 405 wherein the remote unit sends a request for a reverse link transmission channel to the hub station. The request includes a remote unit identifier that uniquely identifies the remote unit so that the hub station knows which remote unit is requesting a reverse link transmission channel.

The process 400 then moves to a decision state 410 to determine whether a broadcast message has been received from the hub station. If no broadcast message has been received, the process 400 moves to a state 415 and waits for a predetermined time before returning to the decision state 410 and looking for a broadcast message.

Once a broadcast message has been received by the remote unit, the process 400 moves to a state 420 wherein a list of remote unit identifiers is gathered from the broadcast message and stored to a frequency table. As discussed above, the frequency table includes potential frequencies and time slots that make up every potential reverse link transmission channel that could be used for sending data from a remote unit to a hub station.

Once the list of remote unit identifiers has been stored to the frequency table at the state 420, the process 400 moves to a state 425 wherein instructions are run within the remote unit for scanning the frequency table to determine the position of the current remote unit's identifier. Thus, at this stage, the remote unit is looking for its own unique identifier within the frequency table in order to determine which frequency and time slot it has been assigned by the hub station.

The process 400 then moves to a decision state 430 wherein a determination is made whether the current remote unit identifier is found within the frequency table. If the remote unit identifier is not found, the process 400 moves to an error handler routine at a state 435 and then returns to the state 405 to re-request a reverse link transmission channel.

If a determination is made at the decision state 430 that the current remote unit's identifier was found, the process 400 moves to a state 440 wherein the reverse link transmission channel assigned by the hub station is determined by analyzing the location of the current remote unit's identifier within the frequency table. The process 400 then moves to a state 445 wherein the remote unit transmits data along the assigned transmission channel to the hub station. The process then terminates at an end state 450.

Figure 5:
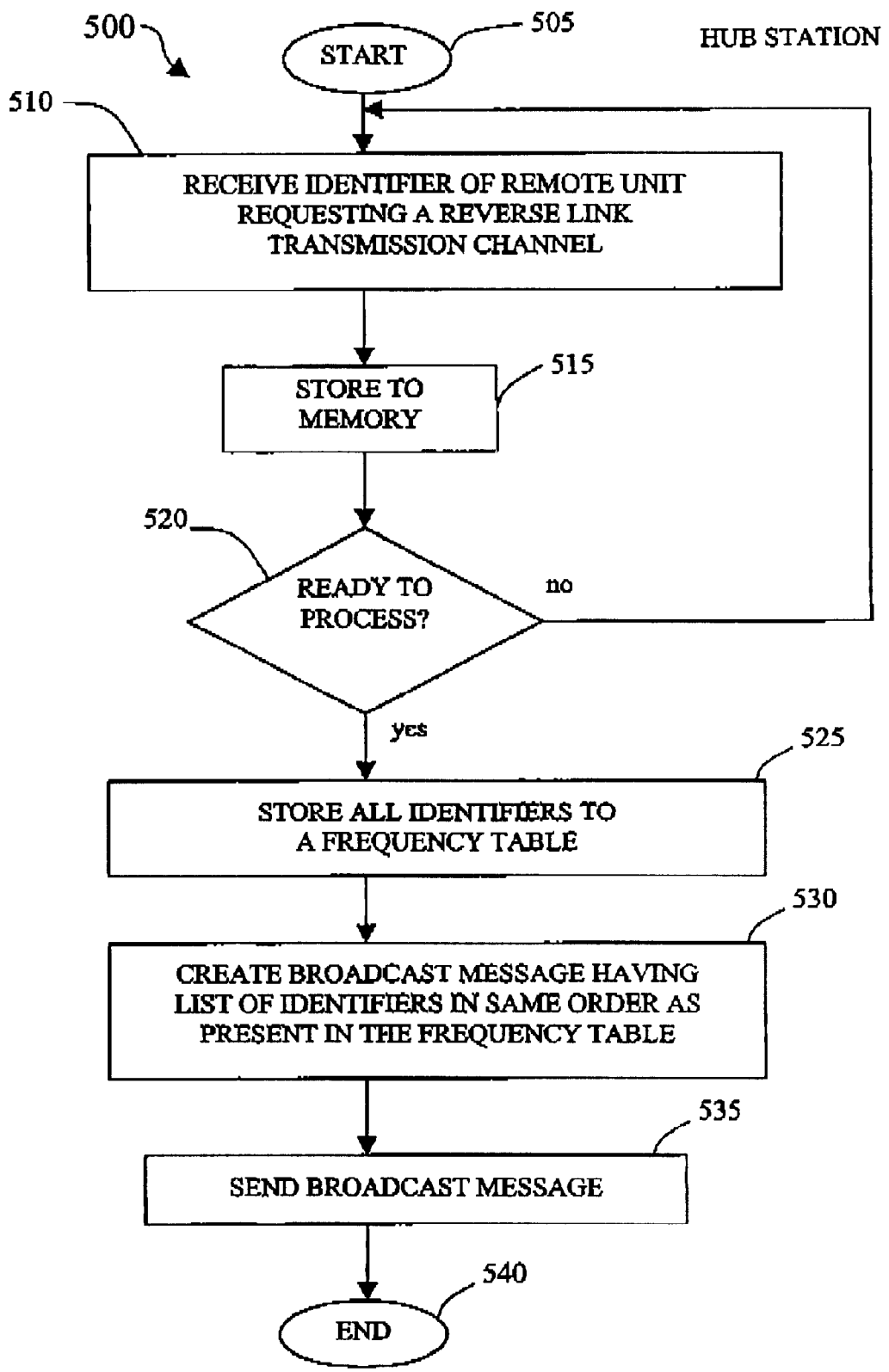
FIG. 5 is a flow chart showing remote unit operation.

Referring now to FIG. 5, a process 500 for assigning reverse link transmission channels running within the hub station is described. The process 500 begins at a start state 505 and then moves to a state 510 wherein the hub station receives a first identifier for a remote unit requesting a reverse link transmission channel. The identifier is then stored to a memory within the hub station at a state 515. It should be realized that the memory could be any type of conventional dynamic memory, read only memory, hard disk, or other conventional storage or memory system or apparatus.

The process 500 then moves to a decision state 520 to determine whether the hub station is ready to process each of the identifiers that have been received and stored to memory. Normally, the hub station will wait a predetermined time before beginning to process the remote unit identifiers so that it can broadcast a single message to numerous remote units requesting reverse link transmission channels. Thus, the process 500 waits a predetermined time at the decision state 520 before proceeding to process a broadcast message that assigns transmission channels to the remote units.

Once a determination is made at the decision state 520 that the hub station is ready to process the received and stored remote identifiers, the process 500 moves to a state 525 wherein all of the identifiers are stored to a frequency table. As discussed previously, the frequency table within the hub station is preferably the same as the frequency table stored within each remote unit so that a remote unit identifier stored in a particular position within the frequency table of the hub station will have a corresponding position in a frequency table in the remote unit.

Once all of the identifiers from each remote unit requesting a transmission channel have been stored to a hub station frequency table at the state 525, the process 500 moves to a state 530 wherein a broadcast message is created that lists each remote unit identifier that has requested a transmission channel within the frequency table. It should be realized that the broadcast message should preferably create the list of remote unit identifiers in the order that they appear within the frequency table so that a "duplicate" frequency table can be created within each of the remote units requesting a transmission channel.

The process 500 then moves to a state 535 where the broadcast message is sent to each remote unit. The process then terminates at an end state 540.

D. Other Embodiments

In another embodiment, the frequency assignment process discussed above is used to assign frequencies and time slots for a reservation channel. the reservation channel is a communication link between the hub station and a remote unit. The reservation channel provides remote unit status, transmission indications and queue length information as disclosed in the above-referenced patent application Ser. No. 09/407,639.

In use, each remote unit continually provides its status and other information to the hub station over the reservation channel. Thus, it is efficient to assign reservation channel resources to only those remote units that are currently on-line and ready to transmit information. Any remote units that are off-line do not need to have resources assigned. Once a remote unit comes on-line, the hub station reassigns the reservation channel resources by sending a broadcast message as discussed below.

It should be realized that each remote unit is preferably made aware of a factor N that normally corresponds to the modulo used by the system for determining how to divide the reservation channel resources between all of the on-line remote units. As is known for a time division multiplex system, each remote unit is assigned a particular frequency and time slot for transmitting data. As time progresses, the time slot assignment for each remote unit to transmit data is moved forward, normally by a fixed amount N. Thus, in one embodiment, if there are 100 remote units, the factor N is 100 so that each remote unit transmits data every 100 time slots. By changing the modulo factor, N, to match current operating conditions, a system with only 50 remote units provides resources to those remote units twice as often as a system with 100 remote units.

Stored within the hub station and each remote unit is a reservation channel frequency table that lists all of the available transmission frequencies and all of the available time slots within each frequency. On initialization, instructions running in the hub station determine the number of remote units that are currently on-line and ready to transmit data. The number of on-line remote units is used to determine the modulo (N) for assigning reservation channel resources.

It should be realized that on initialization each remote unit can be assigned a unique identification number by the hub station, or alternatively be pre-programmed with a set remote unit identifier.

The hub station then sends a broadcast message that contains an ordered list of remote unit identifiers to the remote units. Instructions in hub station and the remote units compare the ordered list of remote unit identifiers with their internal reservation channel frequency table to determine which frequency and time slot has been assigned to which remote unit.

For example, if a remote unit has an identifier of "123", instructions within the remote unit store the ordered list to the reservation channel frequency table. The instructions then search that table for the presence of the "123" identifier. Once the identifier is found, the remote unit's instructions determine the frequency and time slot to use for the remote unit's reservation channel based on the identifier's position in the table. In addition, the modulo to be used by the remote unit can be determined in two alternative ways.

In a first embodiment, the remote unit can count the number of remote unit identifiers that were transmitted in the broadcast message from the hub station. Since the broadcast message contains identifiers for each on-line remote unit, this is one mechanism for determining how many remote units are on line. Each remote unit thereby calculates its modulo based on the total number of remote units identifiers in the broadcast message.

In a second embodiment, the modulo is included in the broadcast message from the hub station. Thus, the broadcast message comprises a list of remote unit identifiers and one modulo value to be used by each remote unit. This embodiment has the advantage that the hub station can send a modulo that differs in value from the total number of remote units. For example, the hub station might "pad" the modulo value to add an additional 5, 10, or 15 reservation channel resources into the system. In this manner, if additional remote units come on line, the hub station can individually assign them one of the open resources without having to change the resource assignments of all the remote units.

In this manner, the spectrum of available frequencies/time slots is allocated to the pool of remote units so that they can transmit information quickly.

In one embodiment, once the system is initialized, the reservation channel frequencies/time slots do not normally change until a remote unit enters or leaves the system. Once either event is noted by instructions at the hub station, the new remote unit is individually assigned a free resource, if available, or a new broadcast message is sent reassigning the frequencies and time slots for the new pool of remote units. Thus, if several remote units leave the system, more time slots will be available for the remaining remote units. Similarly, if more remote units enter the system, there will be fewer time slots available, and the transmission frequency between the remote unit and the hub station will slow down.

In another embodiment, the hub station can allocate reservation channel resources by correlating the remote unit identifier with a position in the reservation channel frequency table. Accordingly, the hub station can, for example, assign a remote unit an identifier of "50". The remote unit can then look to the $50^{th}$ position in the reservation channel frequency table to determine which frequency and time slot to use for data transmissions. In a reverse channel resource allocation message, the hub station preferably transmits the modulo for all of the remote units but does not need to transmit remote unit identifiers.

In an additional embodiment, the hub station can manipulate the reservation channel assignments and modulo to provide some remote units with more resources than other resources. For example, if there are 50 remote units currently on-line in the system, the hub station might assign a modulo of 100. Thus, each remote unit would skip one turn it might otherwise have to send data since the latter 50 time slots of the modulo would go unused. However, if the hub station filled in the excess resources with additional data transmissions from high use remote units, none of the excess resources would be wasted.

Accordingly, in this additional embodiment, the hub station would first determine which remote units were transmitting high volumes of data across the system. Those remote units would be provided with multiple assignments in the reservation channel frequency table. Thus, the reservation channel frequency table would comprise 100 entries corresponding to the 50 remote units. The identifiers from the highest volume remote units might, for example, be entered five times in the frequency table while the lowest volume remote units would only be entered into the table once. Through this system, the highest volume remote units would be provided with the greatest number of resources, while the lowest volume remote units would be provided with the lowest number of resources.

It should be realized that the examples provided above are only illustrative of the number of remote units or modulo used to manage resources for those remote units. Greater or lesser numbers of remote units are within the scope of embodiments of the invention.

In yet another embodiment, the broadcast message from the hub station does not provide an assignment for every possible transmission channel in the system. In such a case, each remote unit is assigned a transmission channel, and the message is terminated when all needed reverse link resources are assigned. In an alternate arrangement, a dummy remote unit identifier is sent in unassigned channel locations in the message and serves as a placeholder in the frequency table.

In one embodiment, the remote unit and the hub station do not contain tables. Instead, the hub station maintains an ordered list of frequency channels and time slot numbers, such as the following:

| FREQUENCY | TIME SLOT |
| --- | --- |
| 1 | 1 |
| 1 | 2 |
| 2 | 1 |
| 2 | 2 |
| 3 | 1 |
| 3 | 2 |

A similar list is stored in the remote unit. In use, the hub station compares a serial list of remote unit identifiers with this frequency/time slot list in order to determine the proper transmission channel for receiving data. The hub station broadcasts the ordered list of remote unit identifiers. Each remote unit contains a similar list of frequencies and time slots, and by determining the position of the remote unit's identifier in the ordered list, instructions in the remote unit can determine the proper transmission channel to use to send data to the hub station.

The invention may be embodied in other specific forms without departing from its spirit or essential characteristics. The described embodiments are to be considered in all respects only as illustrative and not as restrictive and the scope of the invention is, therefore, indicated by the appended claims rather than by the foregoing description. All changes which come within the meaning and range of equivalency of the claims are to be embraced within their scope.

What is claimed is:

1. A method, in a hub station, of assigning transmission channels to a plurality of remote units, comprising:

receiving a plurality of requests for transmission channels from a plurality of remote units, wherein said requests comprise remote unit identifiers;

assigning a plurality of transmission channels to a plurality of remote unit identifiers by correlating each of said remote unit identifiers with a transmission frequency, wherein correlating each of said remote unit identifiers with a transmission frequency comprises storing said remote unit identifiers in a table, wherein said table comprises transmission frequencies; and broadcasting a message that comprises said remote unit identifiers, but does not contain transmission frequencies.

2. The method of claim 1, wherein said table stores frequencies, time slots, and remote unit identifiers.

3. A method of transmitting data in a communication system, comprising:

transmitting a first request for a first transmission frequency from a first remote unit to a hub station, wherein the first request comprises a first remote unit identifier;

storing the first remote unit identifier to a table in the hub station;

broadcasting a message from the hub station to the remote unit that comprises said first remote unit identifier; and determining the transmission channel for the first remote unit by correlating the first remote unit identifier with its position in a table.

4. The method of claim 3, wherein said table comprises transmission frequencies.

5. The method of claim 3, wherein said table comprises frequencies, time slots, and remote unit identifiers.

6. The method of claim 3, wherein the message further comprises a plurality of remote unit identifiers.

7. The method of claim 6, further comprising determining a modulo for the first remote unit by counting the total number of remote unit identifiers in the message.

8. The method of claim 3, wherein said message further comprises a modulo.

9. An apparatus which assigns reverse link resources to a plurality of remote units, comprising:

means for receiving at a hub station a request for reverse link resources from a plurality of remote units;

means for determining an assignment of reverse link channels to said plurality of remote units, by assigning a plurality of remote unit identifiers to specific positions in a table;

means for creating a message designating said assignment wherein said message designates explicitly a set of remote unit identifiers corresponding to said plurality of remote units and implicitly designates the transmission channel for the plurality of remote unit identifiers according to the location of each remote unit identifier within said message and the position of each remote unit identifier in the table; and means for broadcasting said message to said plurality of remote units.

10. An apparatus which allocates reverse link resources in a multiple access communication system, comprising:

means for requesting reverse link resources for a plurality of remote units from a hub station;

means for storing an identifier associated with each remote unit in a table;

means for receiving a broadcast message assigning reverse link resources to the plurality of remote units wherein said broadcast message designates explicitly a plurality of remote unit identifiers and implicitly designates a channel according to the location of the identifier within said message and its position in the table; and means for transmitting a signal over a reverse link channel corresponding to a location of the remote unit identifiers within said broadcast message.

11. A system for allocating reverse link resources in a multiple access communication system, comprising:

a hub station for receiving a request for reverse link resources from a plurality of remote units wherein the hub unit determines an assignment of reverse link channels to said plurality of remote units by assigning the remote unit identifiers to specific positions in a table, creates a message designating said assignment wherein said message designates explicitly a set of remote unit identifiers corresponding to said plurality of remote units and implicitly designates a channel according to the location of the identifier within the message and the position of the identifier in the table, and broadcasts said message to said plurality of remote units; and a remote unit for requesting reverse link resources from said hub station, wherein the remote unit receives a broadcast message assigning reverse link resources to a plurality of remote units wherein said broadcast message designates explicitly a plurality of remote unit identifiers and implicitly designates a channel according to the location of the remote unit identifier within the message and the position of the remote unit identifier in the table, and transmits a signal over a reverse link channel corresponding to a location of the remote unit identifier within said broadcast message.

* * * * *